United States Patent
Ayers et al.

(10) Patent No.: US 12,520,118 B2
(45) Date of Patent: Jan. 6, 2026

(54) 4G/5G SESSION CONTINUITY MANAGEMENT OPTIMIZATION

(71) Applicant: HEWLETT PACKARD ENTERPRISE DEVELOPMENT LP, Spring, TX (US)

(72) Inventors: John I. Ayers, Omaha, NE (US); David C. Williamson, Plano, TX (US); Lu Tian, Plano, TX (US); Douglas Heim, Plattsmouth, NE (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 499 days.

(21) Appl. No.: 18/087,211

(22) Filed: Dec. 22, 2022

(65) Prior Publication Data

US 2024/0214793 A1    Jun. 27, 2024

(51) Int. Cl.
    *H04W 8/04*     (2009.01)
    *H04L 9/40*     (2022.01)

(52) U.S. Cl.
    CPC ........... *H04W 8/04* (2013.01); *H04L 63/0892* (2013.01)

(58) Field of Classification Search
    CPC ........ H04W 8/04; H04W 8/18; H04L 63/0892
    USPC ...................................................... 370/329
    See application file for complete search history.

(56) References Cited

U.S. PATENT DOCUMENTS

| | | | |
|---|---|---|---|
| 10,524,166 B2 | 12/2019 | Youn et al. | |
| 10,588,056 B2 | 3/2020 | Sahin et al. | |
| 2007/0056020 A1* | 3/2007 | Ward | H04L 63/1408 726/3 |
| 2009/0264131 A1* | 10/2009 | Wu | H04W 36/0005 370/254 |
| 2010/0040024 A1* | 2/2010 | Wu | H04W 36/1443 370/331 |
| 2012/0307797 A1* | 12/2012 | Yuan | H04W 36/0022 370/331 |
| 2018/0063764 A1* | 3/2018 | Bollapalli | H04L 65/1069 |
| 2019/0098485 A1* | 3/2019 | Kenyon | H04B 7/0413 |
| 2019/0357037 A1 | 11/2019 | Velev et al. | |
| 2020/0267529 A1 | 8/2020 | Jing et al. | |
| 2020/0389830 A1 | 12/2020 | Park et al. | |
| 2021/0045021 A1 | 2/2021 | Jeong | |
| 2021/0112462 A1 | 4/2021 | Zhu et al. | |
| 2022/0150811 A1 | 5/2022 | Kim et al. | |

FOREIGN PATENT DOCUMENTS

| | | |
|---|---|---|
| WO | 2018/085187 A1 | 5/2018 |
| WO | 2022/033248 A1 | 2/2022 |

* cited by examiner

*Primary Examiner* — Mang Hang Yeung
(74) *Attorney, Agent, or Firm* — Sheppard Mullin Richter & Hampton LLP

(57) ABSTRACT

Systems and methods are provided for optimizing session continuity management during 5$^{th}$ Generation (5G) and 4G/Long Term Evolution (LTE) interworking. Conventional 4G/LTE and 5G interworking involves session continuity subscription or retrieval operations to obtain the latest mobility data for a user equipment (UE) attempting to attach to a particular communications network. These operations include exchanging various messages can be avoided by determining the existence of an Authentication, Authorization, Accounting (AAA)/evolved Packet Data Network Gateway (ePDG) registration (among other conditions).

20 Claims, 5 Drawing Sheets

4G/5G SESSION CONTINUITY MANAGEMENT OPTIMIZATION

BACKGROUND

Wireless devices (e.g., smart phones, tablets, and laptops) are used to send and receive data. Such data may be transmitted and received over a wireless network. The 5th Generation (5G) standard is a standard promulgated by the International Telecommunication Union (ITU) and the 3rd Generation Partnership Project (3GPP), with the ITU setting the minimum requirements for 5G compliance, and the 3GPP creating the corresponding specifications. 5G is a successor to the 4G/Long Term Evolution (LTE) standard, and refers to the fifth generation of wireless broadband technology for digital cellular networks. 5G is intended to replace or augment 4G/LTE. Touted advantages of 5G include, e.g., exponentially faster data download and upload speeds, along with much-reduced latency (also referred to as "air latency", e.g., the time it takes for a device to communicate with the network).

The frequency spectrum of 5G includes three bands. The first band can be referred to as the low-band spectrum, i.e., the sub-1 GHz spectrum. This low-band spectrum is the primary band used by U.S. wireless carriers with data speeds reaching about 100 Mbps. The second band can be referred to as the mid-band spectrum, i.e., the sub-6 GHZ spectrum, which provides lower latency (e.g., 4-5 ms) and greater data speeds (e.g., up to 1 Gbps) relative to the low-band spectrum. However, mid-band signals are not able to penetrate structures, such as buildings, as effectively as low-band signals. The third band can be referred to as the high-band spectrum, or millimeter wave (mmWave), and operates between 25 GHz and 100 GHz. The term millimeter is associated with this high-band spectrum because wavelengths in this portion of the spectrum range from, e.g., 1-10 mm. Devices operating on this third band can deliver the highest data speed (e.g., up to 10 Gbps) and the lowest latency (e.g., 1 ms). However, its coverage area (the distance it can transfer data) is less than that of the low-band and mid-band spectrums, due in part to poor building penetration. Use of mmWave technology may however, avoid already congested portions of the spectrum. So long as the limited coverage area is acceptable, the benefits of mmWave technology can still be realized.

5G coverage to provide services to users from any physical location requires deployment of 5G cells that provide full coverage. However, currently 5G has been partially deployed, resulting in coverage holes. Thus, 5G provides for interworking with the existing 4G/LTE cellular networks that enables user equipment (UE) mobility between 5G and 4G/LTE cellular networks as UEs move into and out of 5G coverage areas.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
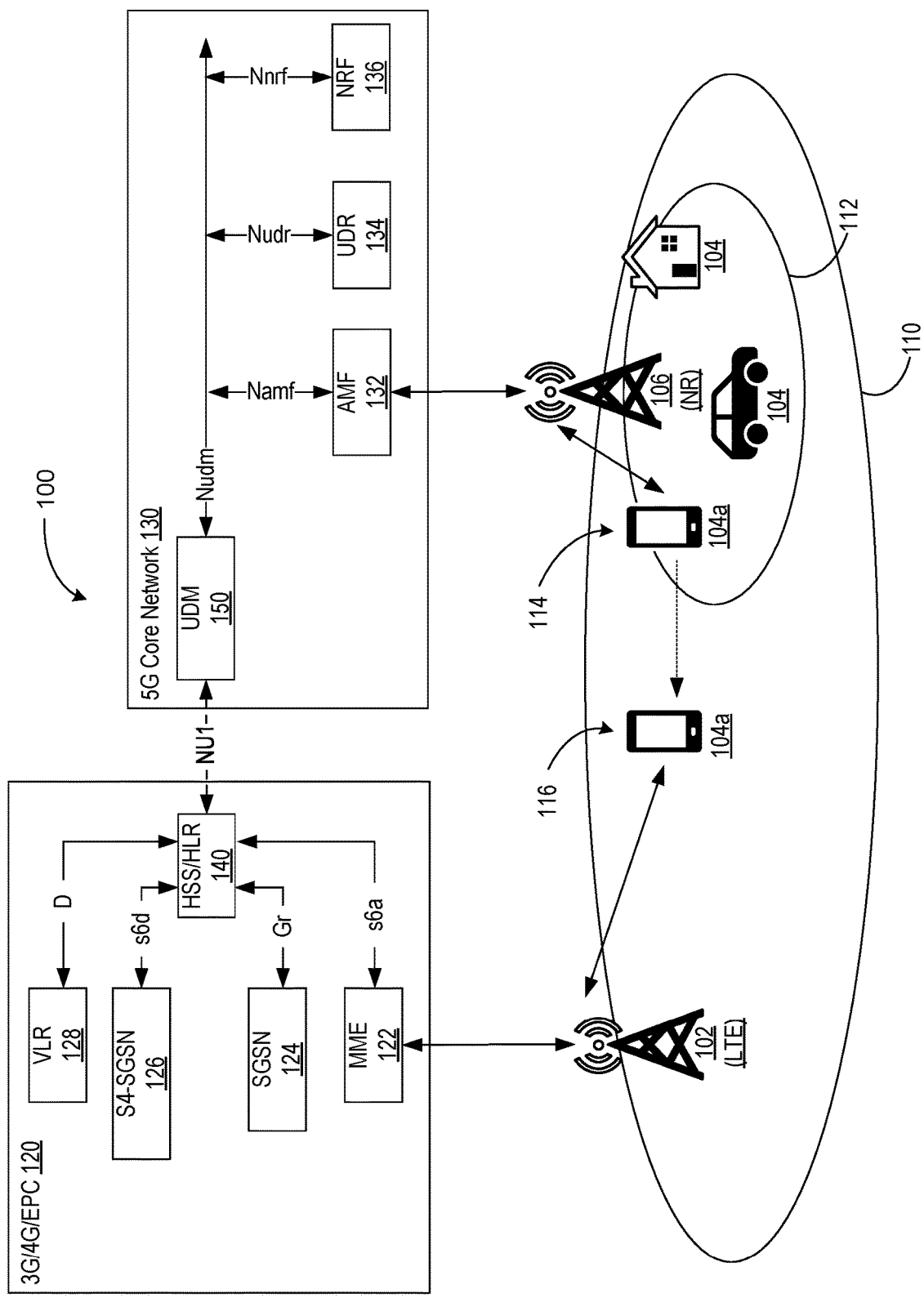
FIG. 1 illustrates an example cellular communication system.

The figures are not exhaustive and do not limit the present disclosure to the precise form disclosed.

DETAILED DESCRIPTION

A mobile network can be thought of as comprising two component networks, the radio access network (RAN) and the core network. In 5G cellular networking systems, these components are a 5G access network (5G-AN) and a 5G core network (5GC). In 4G/LTE cellular networking systems, these components are a radio access network (RAN) and an Evolved Packet Core Network (EPC). The 5GC may include various virtualized network functions (NFs), including, for example, a Core Access and Mobility Management Function (AMF) and a Session Management Function (SMF), both in communication with a Unified Data Manager (UDM). The AMF is configured to handle connection and mobility management tasks. The SMF is responsible for collecting information related to packet data unit (PDU) session management from various network components, while controlling/orchestrating those network components based on requests from the AMF. The UDM is configured to manage user authentication, authorization, and device registration on the 5GC. The EPC may include its own NFs, including, for example, a Mobility Management Entity (MME) in communication with a Home Subscriber Server (HSS). The MME ("reconfigured" in the 5G standard into the AMF/SMF) provides connection management functionality between UEs and the EPC. NFs may be implemented as one or more network devices or apparatuses.

As noted above, the 5G standard provides for interworking with the existing 4G/LTE networks providing, among other functionality, for mobility of UEs between the 5GC and the EPC. 5G and 4G/LTE are generally mutually exclusive, such that a UE may not be attached to the EPC and the 5GC at the same time (except where the networking function of the EPC is set for dual registration), since these correspond with two types of telecommunication networks. Accordingly, session and service continuity between 4G/LTE networks and 5G networks (or their respective services) is a concern when attempting to provide uninterrupted service experiences to users.

Currently, in order to effectuate session/service continuity, an HSS supports AMF and SMF session continuity subscription or retrieval (of subscription data) functionality via multiple interfaces. Specifically, either an S6a attachment from an MME or an SWm interface attachment from an AAA/ePDG can initiate a session continuity subscription/retrieval process. The initiation of a session continuity subscription or retrieval process can involve the transmission and receipt of a plurality of messages/information between the MME and the AMF/SMF (and various network components/functions therebetween). However, implementation of an optional N26 interface, which interconnects a 5GC AMF with a 4G/LTE MME, enables interworking between a 5G network and a 4G/LTE network. The N26 interface, generally, is used to transfer a UE's authentication and session context as the UE moves between 5G and 4G/LTE networks, e.g., supporting session continuity for voice and data during inter-radio access technology (inter-RAT) mobility.

Accordingly, various examples of the disclosed technology are directed to optimizing session continuity functionality by restricting/avoiding additional message traffic based on UE registration with the evolved Packet Data Gateway (ePDG). In this way, unnecessary (by virtue of N26 functionality) S6a/SWm-triggered messaging can be reduced or eliminated. In some examples, if a provider only wishes to perform/maintain session continuity during UE registrations with an authentication, authorization, accounting (AAA) server or with the ePDG, the HSS may be able to leverage UE user or subscriber registration information to determine that no ePDG/AAA registration currently exists in the HSS. In this case, the HSS does not need to subscribe to notifications from the UDM for changes to AMF/SMF context data. Moreover, the HSS need not retrieve AMF/SMF context data from the UDM/Unified Data Repository (UDR). Avoiding subscribing to/retrieving the aforementioned UDM notifications regarding AMF/SMF context data, and avoiding the retrieval of such AMF/SMF context data saves traffic bandwidth between the HSS and the UDM/UDR. Instead, and as alluded to above, session continuity between the MME and the AMF can be performed via the N26 interface. That is, examples of the disclosed technology act to limit the session continuity function from always occurring on all applicable interfaces by restricting session continuity for UE registration with the ePDG/AAA. It should be understood that the ePDG is registered in the AAA server, while the AAA server is registered in the HSS.

In the case of service migration from the 5GC to the EPC, the EPC can notify the 5GC that a UE is attached to the EPC and instruct the 5GC to deregister the UE and cancel 5G services (e.g., using a cancel-location-request (CLR)). For example, when a UE attempts to attach to the EPC, the MME serving the UE initiates a registration call flow to attach the UE to the EPC for 4G/LTE services. This call flow includes, among other functions and operations, requesting registration with the EPC. Responsive to the registration request, the MME issues an Updated Location Request (ULR) to the HSS, which may then inject a deregistration instruction into the 5GC. The deregistration instruction is provided to the UDM and delivered to the AMF. The AMF then deregisters the UE from the 5G cellular network, thereby cancelling 5G services rendered thereto.

Thus, regarding session retrieval/subscription functionality, when a UE attaches to a network, such as a 4G/LTE network, the 4G/LTE network will ping the 5G network from where the UE came to retrieve new or certain dynamic data applicable to that UE for continuing the session/service. That is, and during the registration process, the UE sends messages through various interfaces and different equipment (e.g. AAA or MME, or SGSN) to the HSS for service. As part of the registration process, the HSS has the optional ability to perform session continuity (AMF/SMF session subscription and/or retrieval) by communicating with the 5G network entities to obtain additional profile-sensitive information that can be included in the UE's profile information downloaded from the HSS to the serving entity. The HSS performs a number of functions including roaming checks, integrity and validations and responds with either success or failure indications to the UE. It should be understood that the HSS is responsible for downloading UE profile information utilized by network elements for providing various services. The UE profile can contain a list of up to 50 access point names (APNs) that contain configuration information for such various services, of which some APNs may be designated as being 4G-only or 4G/5G-shared. The HSS can be configured to perform session continuity subscription/retrieval for "all" APNs, or to only perform session continuity if at least one APN is 4G/5G-shared and "dynamic" in nature. Each of the (up to 50) APNs has the ability to be configured with static address (e.g. IPv4, IPv6, host/realm) information, or it can be dynamic, thereby allowing the APN to be assigned address information dynamically. The aforementioned AMF/SMF context data contains the ongoing session data associated with the APNs. Accordingly, the HSS should attempt to resolve/obtain dynamic address information per APN entry before sending profile information to the serving Network entity (e.g. MME or AAA). Hence, if optimization procedures can be introduced and leveraged to reduce latency and/or avoid unnecessary information retrieval because it is determined that the existing attachments already have that information, or if it is determined that the network configuration doesn't require processing, the HSS can expedite the UE attachment process.

For example, and as will be described in greater detail below, an update location request may be sent from the 4G/LTE network to the 5G network (broadly, from the MME to the HSS to the AMF/SMF, or in some instances, a server assignment request may be sent from the ePDG/AAA to the HSS to the AMF/SMF). Handshaking between various network components to retrieve the new/dynamic data occurs, and the new/dynamic data can be included in the response to the update location request. With session subscription functionality, instead of requesting the new/dynamic data every time a UE attaches to, e.g., the 4G/LTE network, the 4G/LTE network can subscribe to the 5G network such that the 5G network simply pushes any new/dynamic data to the 4G/LTE network. In either scenario, latency/delays are experienced due to the transmission of the update location request, the handshaking to retrieve the desired data, and/or the transmission of the update location response.

Before describing the details of the various implementations disclosed herein, it would be beneficial to describe an example cellular network to which the aforementioned UE may register and deregister. FIG. 1 illustrates an example cellular communication system 100 with which various implementations of the present disclosure may be implemented. The cellular communications system may comprise a plurality of base stations or cells (e.g., base stations 102 and 106), user equipment (UE) 104, an Evolved Packet Core (EPC) 120, and another core network 130 (e.g., a 5GC) operating on different types of telecommunications networks. The base stations 102 may include macrocells (high power cellular base station) and/or small cells (low power cellular base station).

In the illustrative example of FIG. 1, base station 102 is configured according to 4G/LTE standards and interfaces with the EPC 120 through an S1 interface. Base station 106 is configured according to 5G standards and interfaces with core network 130 through an N1/N2 interface. The base stations 102 and 106 may wirelessly communicate with one or more UEs 104. Each of the base stations 102 and 106 may provide communication coverage for a respective geographic coverage area 110 and 112, respectively. There may be overlapping geographic coverage areas. For example, the base station 102 may have a coverage area 110 that overlaps the coverage area 112 of one or more other base stations, such as base station 106 as shown.

While a single base station 102 (e.g., a 4G/LTE configured base station) and a single base station 106 (e.g., a 5G configured base station) are illustrated, the cellular communication systems disclosed herein are not limited thereto. One or more base stations 102 and/or one or more base stations 106 may be provided. For example, a plurality of base stations 102 may be provided, each having a respective coverage area 110. One or more of the respective coverage areas 110 may overlap. Similarly, a plurality of base stations 106 may be provided, each having a respective coverage area 112. One or more of the respective coverage areas 112 may overlap. Furthermore, one or more coverage areas 110 may overlap with one or more coverage areas 112.

Base stations 102 and 106 may include an eNB, gNodeB (gNB), or another type of base station. Some base stations, such as base station 106, may operate in the frequency spectrum of 5G, including the low-band spectrum, i.e., the sub-1 GHz spectrum; the mid-band spectrum, i.e., the sub-6 GHZ spectrum; and/or the high-band spectrum, e.g., millimeter wave (mmWave) that operates between 25 GHz and 100 GHz.

EPC 120 includes various network function entities, including, for example but not limited to, one or more Mobility Management Entity (MME) or Mobility Management Device (MMD) 122 (used interchangeably), a Serving Gateway (S-GW) (not shown), a Packet Data Network (PDN) Gateway, also referred to as PGW (not shown here), among other network function entities. Although MME or MMD 122 is illustrated in FIG. 1, this device may correspond with any type of mobility management device, including a Serving General Packet Radio Service (GPRS) Support Node (SGSN), a S4-SGSN, and a Visitor Location Register in various examples, and these terms are used interchangeably throughout the disclosure.

Each MME 122 may be in communication with a Home Subscriber Server (HSS) 140 over a designated interface, for example, a S6a interface used for exchange of authentication, location, and server information about subscribers between the HSS 140 and MME 122. Each MME 122 may function as a control node that processes signaling between the UEs 104 and the EPC 120, including providing bearer and connection management functionality. The Packet Data Network (PDN) Gateway may be connected to IP Services, such as the Internet, an intranet, an IP Multimedia Subsystem (IMS), a Packet-Switched (PS) Streaming Service, and/or other IP services.

The NFs of EPC 120 may be implemented as computing systems, such as one or more servers. The NFs of the EPC 120 may communicate using protocols, such as the Diameter Protocol and/or Mobile Application Part (MAP) of the SS7 protocol. For example, the Diameter Protocol may be used for messages between the MME and the HSS or an S4-SGSN and the HSS, while MAP may be used for messages between a Home Location Repository (HLR) and a SGSN or VLR. Data included in the messages on the EPC may be formatted according to American Standard Code for Information Interchange (ASCII) protocols.

Core network 130 may include various virtualized network functions (NFs), including, for example but not limited to, an Authentication Server Function (AUSF) (not shown), Core Access and Mobility Management Function (AMF) 132, a policy control function (PCF) (not shown), a session management function (SMF) (not shown in FIG. 1), a Unified Data Repository (UDR) 134, and a Network Repository Function (NRF) 136, to name a few. For example, AMF 132 may be the control node that processes the signaling between UEs 104, via base station 106 and core network 130.

AMF 132 may receive connection and mobility management tasks from UEs 104 and can handle connection and mobility management tasks, while forwarding session management tasks/messages to the SMF. AMF 132 may be in communication with UDM 150 over a service-based interface (SBI) for UDM 150, such as a Nudm interface.

Core network 130 may also include NRF 136, which provides for network function service registration, authorization, and discovery, and otherwise enables network functions to identity one another. Core network 130 may also include a User Plane Function (UPF) (not shown) that is connected to IP Services, which may include the Internet, an intranet, an IMS, a PS Streaming Service, and/or other IP services.

The NFs of core network 130 may be implemented as computing systems, such as one or more servers. The NFs of core network 130 may communicate using protocols, such as HyperText Transfer Protocol (HTTP). Communications and operations may be sent, for example, using HTTP methods, such as POST, PATCH, GET, PUT, etc.

As noted herein, AMF 132 may receive connection and session-related information from UEs across N1/N2 reference point interfaces (between UE and AMF/between RAN and AMF), but may handle connection and mobility management tasks. That is, an AMF instance may be specified by a UE, e.g., UE 104, in a Non-Access Stratum (NAS) message that is routed to the AMF instance by the RAN. Performing the role of an access point to the 5G core network (terminating the RAN control plane and UE traffic), the AMF instance may authenticate the UE and manage, e.g., handovers, for the UE between access points, base stations, and gNBs.

UDM 150 provides services to other functions of the Service-Based Architecture (SBA), such as AMF 132 and other network functions. UDM 150 may store information in local memory. UDM 150 may also store information externally, for example, within UDR 134. UDM 150 may provide authentication credentials while being employed by AMF 132 to retrieve subscriber data and access registration context data.

Although the preceding description may provide examples based on 5GC and 4G/LTE, it should be appreciated that the concepts described therein may be applicable to other types of telecommunication networks. For example, the concepts described herein may be applicable to legacy networks, such as, GPRS, CDMA, GSM, and/or other wireless technologies in which a UE may operate. For example, EPC 120 may include network functions of the legacy types of telecommunication networks. GPRS core networks included a SGSN configured to perform functions similar to MME 122. EPC 120 may include or be communicably coupled to a SGSN 124 that communicates with the HSS 140 via a designated interface, such as, a Gr interface for routing information between the SGSN 124 and the HSS/HLR 140. In some GPRS core networks, an S4-SGSN is used for performing functions similar to MME 122. EPC 120 may include or be communicably coupled to a S4-SGSN 126 that communicates with HSS 140 via a designated interface, such as, a s6d interface used for exchange of authentication, location, and server information about subscribers between HSS 140 and S4-SGSN 126. GSM core networks include a Visitor Location Register (VLR) configured to perform functions similar to the MME 122 and a HLR performing functions similar to HSS 140.

EPC 120 may include or be communicably coupled to VLR 128 that communicates with HSS 140 via a designated interface, such as a D interface used for routing information between a VLR 128 and the HSS/HLR 140.

The term "mobility management entity" (MME) or "mobility management device" (MMD) can be used herein to refer to one or more of an MME, SGSN, S4-SGSN, VLR, or similar network function entity included in the EPC, while "legacy mobility management device" will be used herein to refer to one or more of SGSN, S4-SGSN, VLR and the like. Additionally, "location and service information interface" may be used to refer to one or more of the s6a, s6d, D, Gr, or similar interfaces between the HSS and a respective mobility management device.

Base stations 102 and/or 106 may provide an access point (AP) to EPC 120 or core network 130 for UE 104. Examples of UEs 104 include cellular phones, smart phones, laptop computers, tablet computers, personal computers, vehicle-implemented communication devices (e.g., vehicles having vehicle-to-vehicle (V2V) capabilities), multimedia devices, game consoles, wearable devices, or any other similar functioning device. Some of UEs 104 may be referred to as IoT devices (e.g., parking meter, gas pump, toaster, vehicles, heart monitor, etc.). Each UE may move about the cellular network system 100 into and out of respective coverages areas (e.g., coverage area 110 and 112).

As noted herein, 5G provides for interworking with the existing EPC providing for mobility of UEs between 5G and 4G/LTE, for example, or other types of telecommunication networks. Accordingly, 5G provides for service migration by attaching to and from each network as the UE moves into and out of coverage areas. Thus, interworking between the networks allows for migration of attachment between the 5GC and EPC through communication between UDM 150 and HSS 140 via a NU1 interface.

For example, as shown in FIG. 1, UE 104a (illustrative depicted as a mobile smartphone) moves from first position 114, in coverage area 112, to second position 116, out of coverage area 112, as shown by the dotted arrow. If UE 104a is capable of receiving 5G services, while present in coverage area 112, UE 104a may be registered with and attached to AMF 132. Upon moving out of coverage area 112 to the 4G coverage area 110, UE 104a will attempt to attach to EPC 120 via a registration request to the MME 122. Once registered and attached to MME 122, UE 104a is able to receive 4g/LTE services via EPC 120.

An interworking functionality facilitates the transition between networks to ensure that seamless transition is achieved. For 5G and EPC interworking, there are generally two solutions: single registration solution and dual registration solution. With the single registration, the UE 104a is permitted to attach to one of the EPC or 5G telecommunication networks at any point in time. Accordingly, a deregistration of the other telecommunication network may be exchanged through a control interface between the telecommunication networks, for example, between HSS 140 to UDM 150 over a NU1 interface when the attachment status of UE 104a is updated. With dual registration, UE 104a may be registered to both the EPC or 5GC telecommunication networks at any point in time, and thus there is no deregistration instruction transmitted as an electronic communication or message between the HSS and the UDM.

As an illustrative example, FIG. 1 shows UE 104a at first position 114, at which point the UE 104a is registered with AMF 132 for receiving 5G services. When UE 104a moves to second position 116, UE 104a moves out of the 5G coverage area 112 and needs to attach to EPC 120 to receive 4G/LTE services, which allows UE 104a to move from a first type of telecommunication network to a second type of telecommunication network. To do so, UE 104a issues a registration request to a MMD of EPC 120 and the MMD sends an update location request (ULR) to the HSS 120, via a respective location and service information interface. For example, an Update Location Request is transmitted according to the Diameter Protocol and an Update Location is transmitted according to the MAP protocol. The term "update location request" or "ULR" will be used herein to refer to an Update Location Request sent under the Diameter protocol and/or an Update Location sent under the MAP protocol. HSS 120 checks subscriber data to confirm UE 104a is permitted to attach to EPC 120 and other subscription information and, if so, issues an Update Location Answer to the mobility management device. Based on the Update Location Answer, UE 104a is registered with and attached to the MMD for rendering of services in the 4G/LTE telecommunication network.

The ULR includes an indicator, for example, Dual-Registration-5G-Indicator bit 8 in the ULR-Flag attributed-value pair (AVP), that notifies HSS 140 as to whether or not the MMD is configured for dual registration in two types of telecommunication networks. When the MMD is not configured for dual registration, this indicator in the ULR is set to 0. Upon receipt of the ULR from the MMD, HSS 140 transmits a deregistration instruction (e.g., Nudm_UECM-_Dereg-amf) to UDM 150 which delivers the deregistration notification to the registered AMF 132 (if any). Receipt of the deregistration notification may trigger the receiving AMF 132 to deregister UE 104a due to mobility from core network 130 to EPC 120. An example of this exchange is illustrated in connection with FIG. 2, below. According to various implementations disclosed herein, if the MMD is configured for dual registration, upon receipt of the ULR from the MMD, the HSS 140 does not transmit the deregistration instruction since registration with both the EPC 120 and core network 130 (or other two types of telecommunication networks) is permissible.

Figure 2:
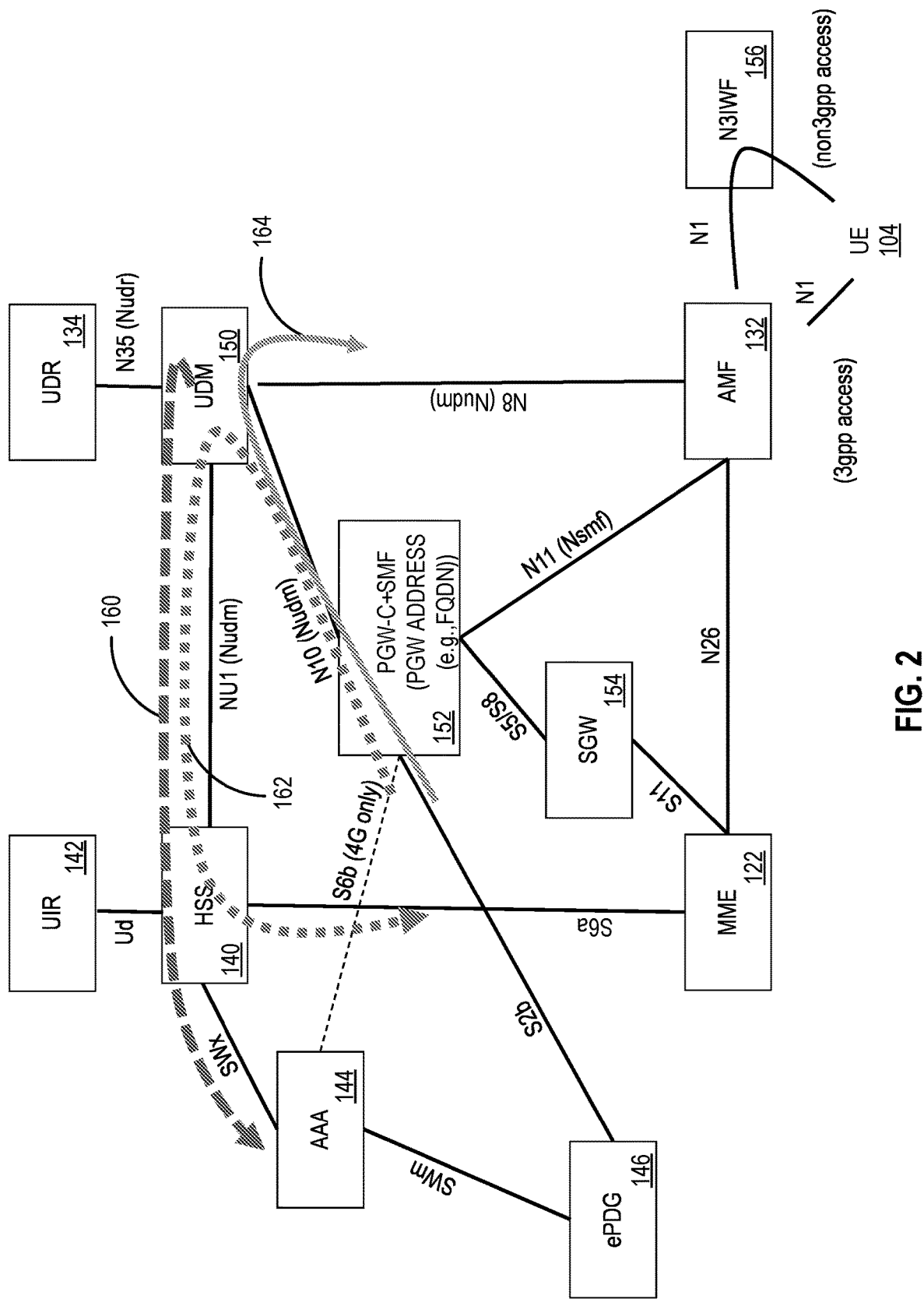
FIG. 2 illustrates a representation of an example session continuity architecture.

Focusing on the session continuity architecture, FIG. 2 illustrates various network components/functions (some of which are already described above) involved in maintaining session continuity between a 4G/LTE network and a 5G network. In addition to the above-described network components/functions, as illustrated in FIG. 2, a Universal Identity Repository (UIR) 142 may act as a back-end data repository for HSS 140. UIR 142 may be included with or as part of HSS 140, or may be remote therefrom, and communicably coupled (e.g., via wired or wireless communication mechanisms), in this example, via a User Data (Ud) interface (UDR 134 may communicate with UDM 150 over a Nudr interface used by NFs to access particular data stored in UDR 134). It should be understood that in some implementations/deployments (and as will be described below), the functionality of HSS 140 and AAA server 144 may be incorporated into what can be referred to as an Integrated HSS (I-HSS). As alluded to above, AAA server 144 may be a server/server program that handles/manages UE-related authentication, authorization, and accounting regarding e.g., services/functions to which a UE subscribes. AAA server 144 may my communicably connected to HSS 144 via an SWx interface that is a Diameter protocol-based interface used when a UE engages in non-3gpp access (e.g., WiFi calling).

Also illustrated in FIG. 2, and alluded to above is ePDG 146. ePDG 146 provides secure access to a UE connecting to PGW 152. PGW 152 may comprise a PGW-C function, which refers to a 4G session management function. In order to achieve 4G/5G continuity, the PGW-C and SMF are implemented in/as the same functional entity with the PGW address (fully qualified domain name (FQDN)/IP address), which is part of the session information for an APN used for interworking. Moreover, ePDG 146 operates to connect PGW 152 to AAA server 144. ePDG 146 may act as a gateway responsible for interconnecting the EPC with non-3gpp trusted networks, such as WiFi networks. ePDG 146 may communicate with AAA server 144 via an SWm interface. AAA server 144 may be communicably connected to PGW 152 via an S6b interface used to inform AAA server 144 about the identity of PGW 152, and the access point name (APN) being used for a particular UE. The ePDG 146 may communicate with PGW 152 via an S2b interface, which can use the PMIPv6 protocol to establish WLAN session between a UE and PGW 152.

PGW 152 may communicate with serving gateway (SGW) 154, whose role is to route/forward user data packets within the network(s), and is also responsible for certain types of handovers, while providing mobility between the 4G/LTE network and other types of networks. PGW 152 and GSW 154 may communicate over S5/S8 interface which can use GTP V2 over UDP transport protocol. The S5 interface can be used in non-roaming scenarios, while the S8 interface can be used in roaming scenarios. The S5/S8 interface provides user plane tunneling and tunnel management, as well as providing the user and control plane between SGW 154 and PGW 152. In turn, SGW 154 may communicate with MME 122 over an S11 interface used to coordinate the establishment of System Architecture Evolution (SAE) bearers within the EPC.

PGW 152 (which includes the SMF) may interact with AMF 132 over an N11/Nsmf interface. Because the SMF is responsible for interacting with the decoupled data plane (an aspect of 5G SBA), PDU session management, and managing session context with the user plane function, the N11 interface allows for the establishment, coordination, and termination of different PDU session types. The N11 interface may use an SBI message bus.

FIG. 2 further illustrates the interaction between UE 104, AMF 132, and N3IWF 156. It should be understood that N1IWF 156 acts as a gateway for the 5GC, and provides a secure connection for UE 104 accessing the 5GC over a non-3gpp access network with support for IPSec between UE 104 and N3IWF 156. Communication/interaction can be effectuated over an N1 interface, a transparent interface, between UE 104 and AMF 132 used for transferring UE information (related to connection, mobility, and sessions) to AMF 132, either directly, or by way of N3IWF 156.

As noted above, ePDG 146 may act as a gateway responsible for interconnecting the EPC with non-3gpp trusted networks, such as WiFi networks, thus ultimately enabling UE 104, for example, to access/avail itself of the non-3gpp trusted network(s). As illustrated in FIG. 2, UE 104 may perform a handover from AMF 132 to AAA server 144, by virtue of HSS 140 subscribing to or retrieving AMF context data (from AMF 132). When the UE 104 is performing a handover from AAA server 144 to MME 122, HSS 140's subscription to/retrieval of, in this instance, SMF context data (from SMF 152) facilitates such a handover. When UE 104 performs a handover from AAA server 144 to AMF 132, AMF 132 subscribes to or retrieves SMF context data. Between MME 122 and AMF 132, when an N26 interface is present, UE 104 handover between MME 122 and AMF 132 is effectuated via the exchange of requisite data over the N26 interface, i.e., shared between MME 122 and AMF 132 without a need to subscribe to/retrieve AMF context data. However, if the N26 interface is not present, an S6a notify request triggers a session subscription/retrieval request as will be described in greater detail below.

Arrows 160, 162 and 164 illustrate various network entity interactions regarding subscriptions to/retrievals of AMF/SMF context data. For example, for an AMF 134 to AAA 144 UE handover and an AAA 144 to MME 122 handover, HSS 140 subscribes to be notified of AMF context data change 160 and of SMF context data change 162 vis-à-vis UDM 150. When a UE hands over from AAA 144 to AMF 132, AMF 132 may subscribe to be notified of SMF context data change 164 vis-à-vis UDM 150.

Figure 3:
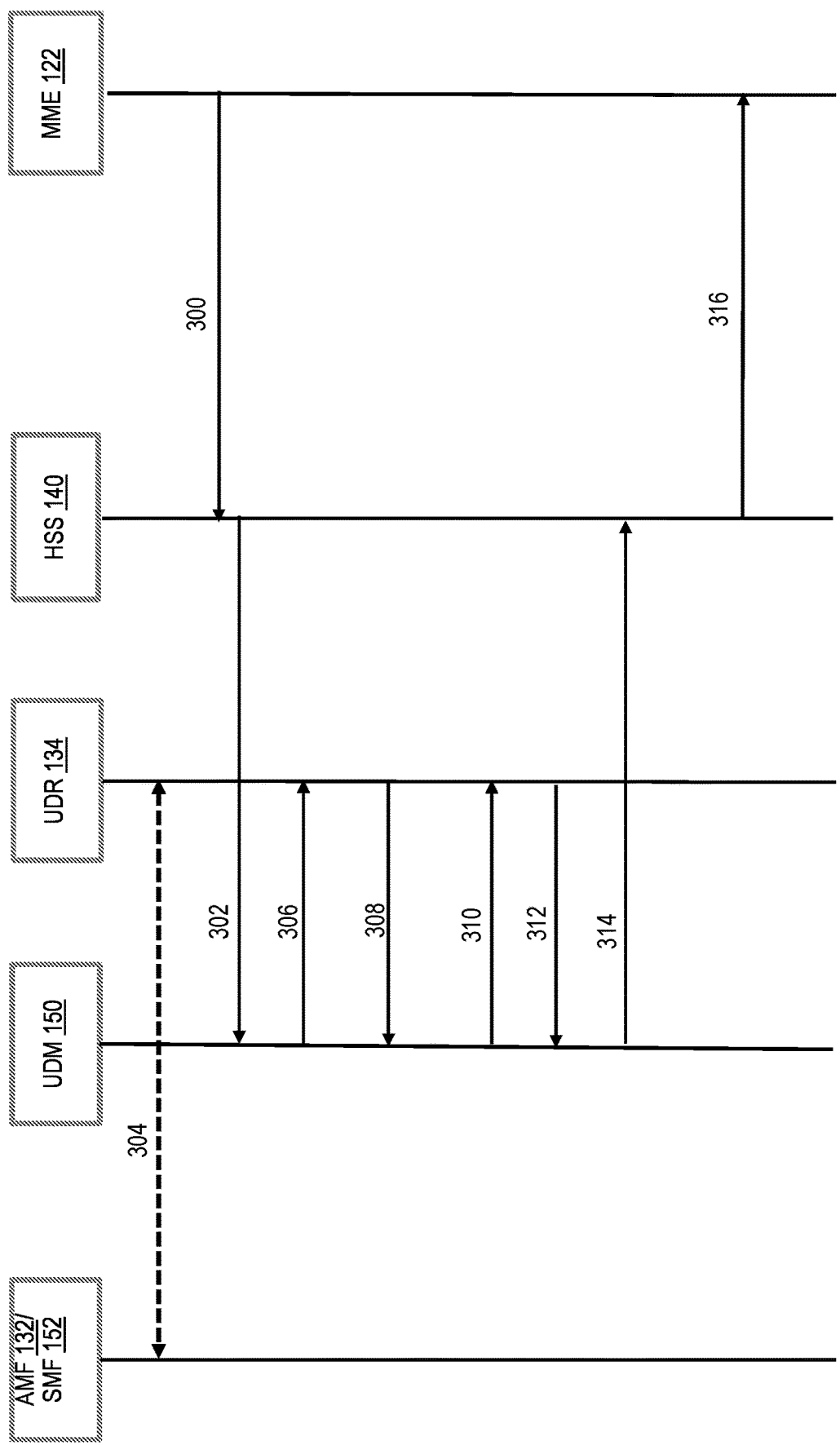
FIG. 3 illustrates an example message flow diagram reflecting a session continuity subscription request/response process in accordance with some examples of the technology disclosed herein.

FIG. 3 is a diagram illustrating the S6a-initiated session continuity subscription request/response process, at least certain messages/exchanges of which, examples of the disclosed technology seek to avoid in order to optimize session management. In particular, FIG. 3 illustrates registration processing initiated by an MME, e.g., MME 122, to an HSS, e.g., HSS 140, which ultimately triggers AMF/SMF session continuity traffic/messaging. As alluded to above, UE registration may occur when handing over between 4G/LTE and 5G networks, and when a UE first attempts to register, MME 122 may transmit an "S6a update location request" 300 to HSS 140. In turn, HSS 140 may communicate with UDM 150 (recalling that the UDM manages user authentication, authorization, and device registration on the 5GC) by transmitting an instruction or operation "POST udm-sdm/{ueld}/sdm-subscriptions (SdmSubscription)" 302, where "POST" refers to an HTTP message type.

As illustrated in FIG. 3, 304 refers generally to those particular messages of the described message exchange that include updated, dynamic (changing/changeable) information that eventually is passed to the HSS via session continuity processing (e.g., the dynamic session information per APN entry).

Accordingly, UDM 150 returns "POST udr-dr subs-to-notify (SubscriptionDataSubscriptions)" message 306 to UDR 134. UDR 134 transmits a "201 (SubscriptionsData-Subscriptions)" message 308 back to UDM 150. UDM 150 requests applicable AMF/SMF context data from UDR 134 via "GET udr-dr {ueld)/context-data(AMF_3GPP, SMF_REG)" message 310. UDR 134 returns the requested AMF/SMF context data via "200 (ContextDataSets)" message 312. Upon receipt of the AMF/SMF context data from UDR 134, UDM 150 can respond to HSS 140 with "201 (SdmSubscription)" message 314, including location update information suscriptionURI. HSS 140 returns an "S6A Update Location Answer" 318, which includes information regarding the APN being used for a particular UE, e.g, UE 104. It should be noted that the 200 and 201 response messages from UDR 134 to UDM 150, indicate success or error, the point being that messages 302 through 316 can be avoided via optimization implemented in accordance with various examples. That is, the (oftentimes larger) message exchanges between other network equipment to establish a subscription and future notification message exchanges can be reduced. Regarding the APN, it should be understood that received information, i.e., the S6a Update Location Answer 316, includes state session/retrieval AMF/SMF context information (e.g., address information). The APN configuration profile comprises a grouped attribute value pair (AVP) (that identifies a parameter and its corresponding value), whose data includes more AVPs for the (one to fifty) APNs, and information including the dynamic addresses as part of session continuity subscription/renewal.

Figure 4:
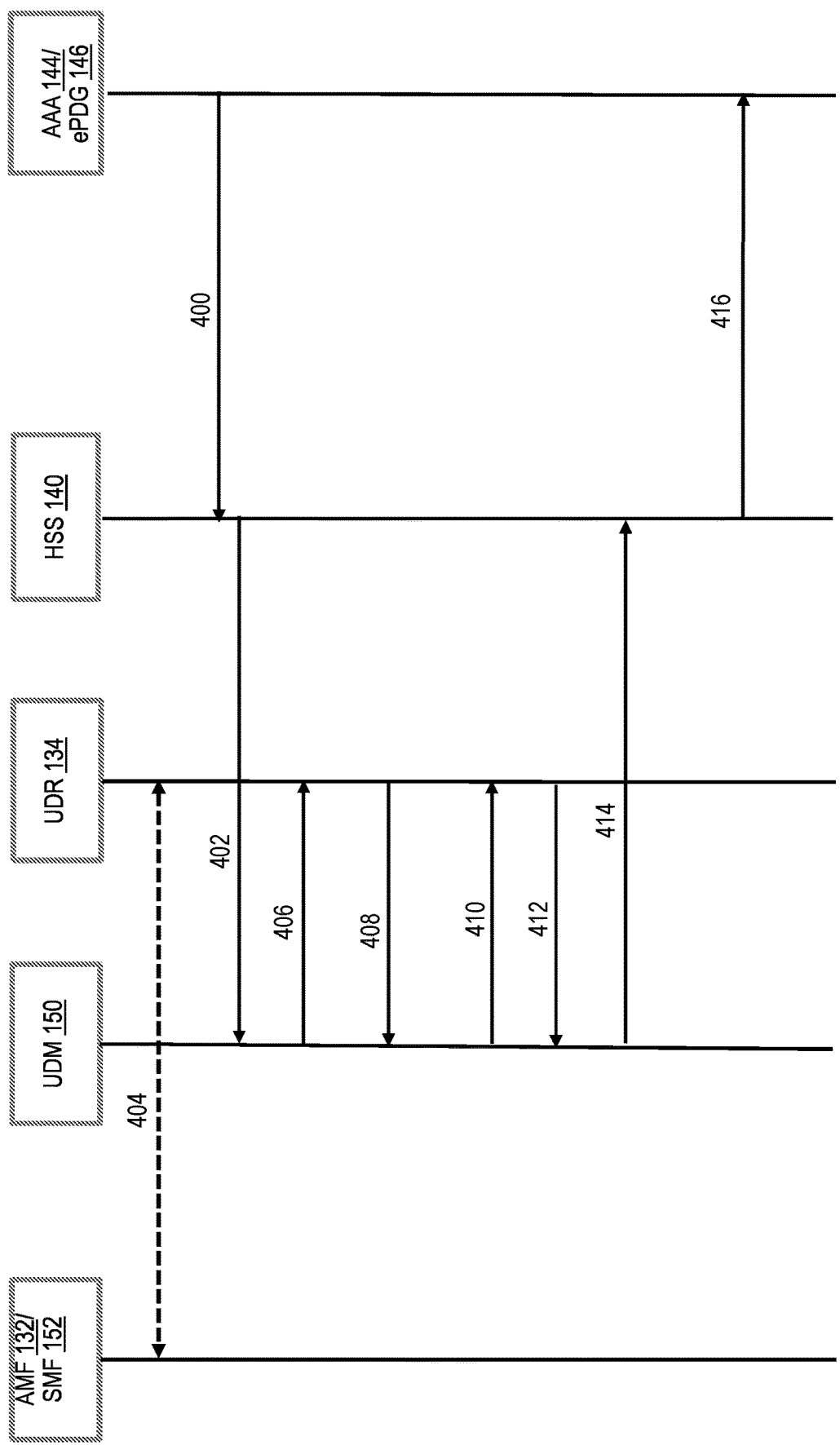
FIG. 4 illustrates an example message flow diagram reflecting a session continuity subscription request/response process in accordance with other examples of the technology disclosed herein.

As noted above, session continuity subscription process can also be performed pursuant to an SWm-initiated session subscription request vis-à-vis AAA 144/ePDG 146. FIG. 4 illustrates such a session subscription request/response process. That is, AAA 144/ePDG 146 may transmit an SWx Server Assignment Request 400 to HSS 140, which in turn may communicate with UDM 150 (recalling that the UDM manages user authentication, authorization, and device registration on the 5GC) by transmitting an instruction or operation "POST udm-sdm/{ueId}/sdm-subscriptions (SdmSubscription)" 402.

As illustrated in FIG. 4, 406 refers generally to those particular messages of the described message exchange that include updated, dynamic (changing/changeable) information that eventually is passed to the HSS via session continuity processing (e.g., the dynamic session information per APN entry). Accordingly, UDM 150 returns "POST udr-dr subs-to-notify (SubscriptionDataSubscriptions)" message 406 to UDR 134. UDR 134 transmits a "201 (SubscriptionsDataSubscriptions)" message 408 back to UDM 150. UDM 150 requests applicable AMF/SMF context data from UDR 134 via "GET udr-dr {ueId}/context-data(AMF_3GPP, SMF_REG)" message 410. UDR 134 returns the requested AMF/SMF context data via "200 (ContextDataSets)" message 412. Upon receipt of the AMF/SMF context data from UDR 134, UDM 150 can respond to HSS 140 with "201 (SdmSubscription)" message 414, including location update information suscriptionURI. HSS 140 transmits an "Swx Assignment Answer" 416, which includes information regarding the APN being used for a particular UE, e.g, UE 104.

Referring to both FIGS. 3 and 4, and as can be appreciated, the S6a-triggered messaging can be bypassed or avoided in certain circumstances, but session continuity subscription/retrieval pursuant to an ePDG/AAA registration may still occur as will be described below. Examples of the disclosed technology, as alluded to above results in steering session continuity processing towards eDPG/AAA registration while avoiding redundant S6a session continuity processing. Indeed, as discussed above, when session continuity via an ePDG/AAA has been previously established, and is valid, there is no need for session continuity re-subscription (or retrieval), which can incur messaging overhead, and introduce latency. It should be further understood that, with session continuity subscription, a network element, such as HSS 140 subscribes to AMF/SMF context data resulting in AMF/SMF context data being pushed to HSS 140 as needed, with session continuity retrieval, HSS 144 proactively obtains the AMF/SMF context data.

It should be noted that the terms "optimize" and "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 5:
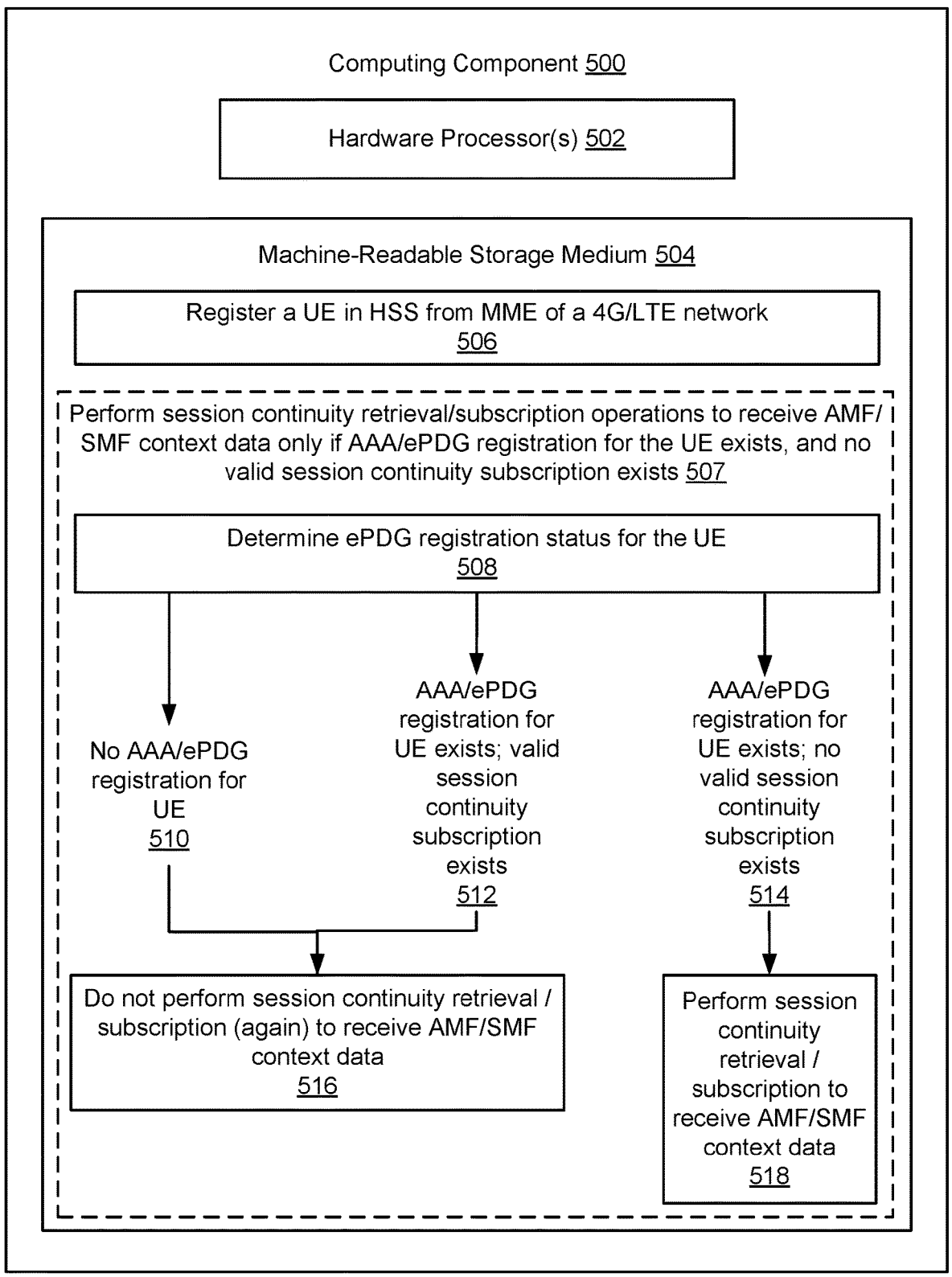
FIG. 5 is an example computing component that may be used to implement various features of session continuity retrieval/subscription management optimization in accordance with examples of the technology disclosed herein.

FIG. 5 is an example computing component 500 that may be used to implement various features of the elements, network functions, etc. illustrated in any of FIGS. 1-4 in accordance with one embodiment of the disclosed technology. Computing component 500 may be, for example, a server computer, a controller, or any other similar computing component capable of processing data. In the example implementation of FIG. 5, the computing component 500 includes a hardware processor 502, and machine-readable storage medium 504, and in some scenarios, may be an example implementation of an HSS, such as HSS 104.

Hardware processor 502 may be one or more central processing units (CPUs), semiconductor-based microprocessors, and/or other hardware devices suitable for retrieval and execution of instructions stored in machine-readable storage medium 504. Hardware processor 502 may fetch, decode, and execute instructions, such as instructions 506-518, to control processes or operations for optimizing session continuity management. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-518.

Hardware processor 502 may execute instruction 506 to register a UE with a 4G/LTE network, e.g., register a UE in an HSS from the MME of a 4G/LTE network. It should be noted that when a UE powers on, moves to a network, the UE may attempt to attach to/register with different network entities, such as the MME or in other instances, the ePDG/AAA. For example, when a UE attempts to attach to the EPC, the MME serving the UE initiates a registration call flow to attach the UE to the EPC for 4G/LTE services (see, FIG. 3). In other instances, a UE may attempt to attach to the ePDG/AAA, in which case the ePDG/AAA initiates a registration call flow to attach the UE to the EPC (see, FIG. 4). This call flow includes, among other functions and operations, requesting registration with the EPC. Responsive to the registration request, the MME issues an Updated Location Request (ULR) to the HSS. As discussed above, typically, the MME-initiated registration call/message flow involves S6a-triggered messaging to initiate a session continuity subscription request. The result is messaging/information being exchanged between the HSS and the UDM/UDR in order to obtain AMF/SMF context data to be added to a UE's profile. It is this messaging that use of the examples disclosed herein can avoid or reduce, thereby reducing network traffic and processing latency when effectuating session continuity.

Hardware processor 502 may execute instruction 508 to determine AAA/ePDG registration status for the UE. That is, the HSS may determine whether or not the UE has registered with the AAA/ePDG.

Hardware processor 502 may execute instruction 509 to perform session continuity retrieval/subscription operations to receive AMF/SMF context data only if AAA/ePDG registration exists for the UE, and no valid session continuity subscription exists. Hardware processor 502 may execute various instructions to accomplish/achieve instruction 509, and example of which follows.

If an AAA/ePDG registration does not exist (510), in accordance with some examples, there is no need to create or trigger a session continuity subscription. That is, when an N26 interface exists between the MME and the AMF, the information exchanged therebetween is sufficient for purposes of 4G/LTE and 5G interworking. There is no need to subscribe to the aforementioned AMF/SMF context data for the UE profile, hence the resulting optimization of session continuity by reducing the messaging/traffic corresponding to the aforementioned exchange of AMF/SMF context data. It should be understood that if the N26 interface is non-existent/unsupported by a particular network/provider, the typical S6a-triggered message would occur in order to obtain the requisite AMF/SMF context data.

If an AAA/ePDG registration does exist, and a valid session continuity subscription exists (512), the HSS may consider the profile of the UE seeking to attach to the EPC is already up to date, and the existing valid session continuity subscription should not/will not be impacted. Accordingly, and again, subscribing to AMF/SMF context data may be redundant and unnecessary to perform. That is, the S6a-triggered session continuity subscription messaging can be bypassed, so long as the MME and AMF are able to exchange a UE's authentication and session context as the UE moves between 5G and 4G/LTE network via an N26 interface.

In either of the aforementioned scenarios, hardware processor 502 may execute instruction 516 instructing the HSS not to perform session continuity retrieval/subscription again to receive AMF/SMF context data. In operation, a system-level flag may be created at the HSS. During AAA/ePDG or MME registration of a UE attempting to attach to the EPC, if that system-level flag is active/enabled, the HSS will not proceed with session continuity subscription operations if the above-described conditions are met in a given scenario.

In the event that an AAA/ePDG registration does exist, but no valid session continuity subscription exists (514), hardware processor 502 will execute instruction 518 to perform session continuity subscription operations. In this scenario, the existence of an ePDG registration for the UE, suggests that updated AMF/SMF context data may exist/may be needed to effectuate session continuity, and without a valid session continuity subscription in place, the MME (or ePDG/AAA) should retrieve latest AMF/SMF context data. In other words, with an existing ePDG registration, there may be the potential for the MME and the ePDG to have communicated, and thus, a need to update the AMF/SMF context data may exist.

It should be noted that the operations illustrated in FIG. 5, and correspondingly described above, may occur/are applicable to both session continuity subscription and retrieval operations, e.g., in systems/scenarios where session continuity subscription and retrieval are implemented together. That is, in some systems/scenarios, requested AMF/SMF context data may be retrieved, followed by subscription to be notified of such AMF/SMF context data changes, where retrieval of data and subscription to data may occur vis-à-vis multiple, e.g., two-message communications, or via a single subscription message communication along with an "immediate report."

In general, the words "component", "engine", "system", "database", "data store", and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computing components and devices may implement the techniques described herein using customized hard-wired logic, one or more ASICs or FPGAS, firmware and/or program logic which in combination with the computing component causes or programs the computing component to be a special-purpose machine. According to one embodiment, the techniques herein are performed by the computing components and devices in response to processor(s) executing one or more sequences of one or more instructions contained in the main memory. Such instructions may be read into the main memory from another storage medium. Execution of the sequences of instructions contained in the main memory causes the processor(s) to perform the process steps described herein. In alternative embodiments, hard-wired circuitry may be used in place of or in combination with software instructions.

The term "non-transitory media" and similar terms, as used herein refers to any media that store data and/or instructions that cause a machine to operate in a specific fashion. Such non-transitory media may comprise non-volatile media and/or volatile media. Non-volatile media includes, for example, optical or magnetic disks. Volatile media includes dynamic memory, such as the main memory. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise the bus. Transmission media can also take the form of acoustic or light waves, such as those generated during radio-wave and infra-red data communications.

The computing components and devices may also include a network interface coupled to the bus. The network interface provides a two-way data communication coupling to one or more network links that are connected to one or more local networks. For example, the network interface may be an integrated services digital network (ISDN) card, cable modem, satellite modem, or a modem to provide a data communication connection to a corresponding type of telephone line. As another example, the network interface may be a local area network (LAN) card to provide a data communication connection to a compatible LAN (or WAN component to communicated with a WAN). Wireless links may also be implemented. In any such implementation, the network interface sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through the network interface, which carry the digital data to and from computing components and devices, are example forms of transmission media.

The computing components and devices can send messages and receive data, including program code, through the network(s), network link and the network interface. In the Internet example, a server might transmit a requested code for an application program through the Internet, the ISP, the local network and the network interface.

The received code may be executed by the processor as it is received, and/or stored in the storage device, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto.

As used herein, the term "or" may be construed in either an inclusive or exclusive sense. Moreover, the description of resources, operations, or structures in the singular shall not be read to exclude the plural. Conditional language, such as, among others, "can", "could", "might", or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional", "traditional", "normal", "standard", "known", and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more", "at least", "but not limited to", or other like phrases in some instances shall not be read to mean that the narrower case is intended or required in instances where such broadening phrases may be absent.

What is claimed is:

1. A network component, comprising:
a processor; and
a memory operatively connected to the processor, and including computer code that when executed, causes the processor to:
register a user equipment (UE) at the network component;
determine whether the UE is registered at another network component; and
one of:
instruct the network component to avoid re-performing session continuity operations to receive UE profile-related information in response to a determination that no registration for the UE exists at the other network component;
instruct the network component to avoid re-performing session continuity operations to receive the UE profile-related information in response to a determination that a registration for the UE exists at the other network component, and that a valid session continuity subscription to the UE profile-related information exists; or
perform session continuity operations to obtain the UE profile-related information in response to a determination that a registration for the UE exists at the other network component, and that a valid session continuity subscription to the UE profile-related information is non-existent.

2. The network component of claim 1, wherein the network component comprises a home subscriber server (HSS) of a 4G network.

3. The network component of claim 2, wherein the registration of the UE occurs pursuant to an attempt by the UE to attach to a mobility management entity (MME) of the 4G network.

4. The network component of claim 3, wherein the other network component comprises an authentication, authorization, accounting (AAA) server/evolved packet data network gateway (ePDG) of the 4G network.

5. The network component of claim 3, wherein the session continuity operations are performed pursuant to S6a-triggered messaging transmitted by the MME to the HSS.

6. The network component of claim 5, wherein the UE profile-related information comprises an access and mobility management function (AMF) context data and a session management function (SMF) context data.

7. The network component of claim 6, wherein the session continuity operations, the performance of which are to be avoided, comprise operations for retrieving the AMF context data and the SMF context data.

8. The network component of claim 6, wherein the session continuity operations, the performance of which are to be avoided, comprise operations for subscribing to updates regarding the AMF context data and the SMF context data.

9. The network component of claim 6, wherein the AMF context data and the SMF context data originate at an AMF and SMF, respectively, of a 5G core network.

10. The network component of claim 6, wherein the MME and the AMF communicate to exchange the AMF context data and the SMF context data over an N26 interface.

11. The network component of claim 6, wherein the UE profile-related information comprises access point names (APNs) containing service configuration information.

12. The network component of claim 11, wherein the AMF context data and the SMF context data contain ongoing session data associated with the APNs.

13. A method, comprising:
    registering a user equipment (UE) at a home subscriber server (HSS) from a mobility management entity (MME) of a 4G network;
    determining whether the UE has previously registered at an evolved packet data network gateway (ePDG)/authentication, authorization, accounting (AAA) server;
    instructing the HSS to avoid performing session continuity retrieval and subscription operations upon determining that no ePDG/AAA registration for the UE exists or that an ePDG registration for the UE exists along with a valid session continuity subscription; and
    performing session continuity retrieval and subscription operations upon determining that an AAA/ePDG registration for the UE exists and that a valid session continuity subscription is non-existent.

14. The method of claim 13, wherein the session continuity retrieval and subscription operations are performed pursuant to S6a-triggered messaging transmitted by the MME to the HSS during the registering of the UE at the HSS.

15. The method of claim 13, wherein avoiding the performance of the session continuity retrieval and subscription operations comprises avoiding an additional exchange of an access and mobility management function (AMF) context data and a session management function (SMF) context data.

16. The method of claim 15, wherein the exchange of the AMF context data and the SMF context data is triggered by an S6a registration-related request sent from the MME to the HSS.

17. The method of claim 16, wherein the exchange of the AMF context data and the SMF context data has occurred between the AMF or the SMF and a unified data repository (UDR) of a 5G core network.

18. The method of claim 16, wherein the MME and the AMF communicate to exchange the AMF context data and the SMF context data over an N26 interface.

19. A method, comprising:
    registering a user equipment (UE) at a home subscriber server (HSS) from a mobility management entity (MME) of a 4G network;
    determining whether the UE has previously registered at an authentication, authorization, accounting (AAA) server/evolved packet data network gateway (ePDG); and
    performing session continuity retrieval and subscription operations upon determining that an AAA/evolved packet data network gateway (ePDG) registration for the UE exists and that a valid session continuity subscription is non-existent.

20. The method of claim 19, wherein the session continuity retrieval and subscription operations are performed pursuant to S6a-triggered messaging transmitted by the MME to the HSS during the registering of the UE at the HSS.

* * * * *